United States Patent
Read et al.

[11] Patent Number: 5,835,130
[45] Date of Patent: Nov. 10, 1998

[54] VIDEO TELEPHONY SYSTEM WITH HOLD PROGRAM

[75] Inventors: Christopher Jensen Read, San Diego; David Bessel, Poway, both of Calif.

[73] Assignees: Sony Corporation, Tokyo, Japan; Sony Electronics, Inc., Park Ridge, N.J.

[21] Appl. No.: 569,498

[22] Filed: Dec. 8, 1995

[51] Int. Cl.⁶ .......................... H04N 7/14; H04M 11/00
[52] U.S. Cl. ................................. 348/16; 348/14
[58] Field of Search ................... 348/14, 15, 16, 348/17, 18, 19; 379/96, 91, 93, 94, 91.01, 93.17, 93.21, 93.22, 93.25, 93.35, 157

[56] References Cited

U.S. PATENT DOCUMENTS

| | | | |
|---|---|---|---|
| 4,845,636 | 7/1989 | Walker | 379/91 |
| 5,061,992 | 10/1991 | Ueno | 348/14 |
| 5,164,982 | 11/1992 | Davis | 379/91 |
| 5,434,590 | 7/1995 | Dinwiddie, Jr. et al. | 348/16 |
| 5,515,424 | 5/1996 | Kenney | 379/91 |
| 5,537,462 | 7/1996 | Utter et al. | 348/14 |
| 5,606,361 | 2/1997 | Davidsohn et al. | 348/14 |
| 5,636,269 | 6/1997 | Eisdorfer | 348/14 |
| 5,657,246 | 8/1997 | Hogan et al. | 348/14 |
| 5,757,781 | 5/1998 | Gilman et al. | 370/260 |

OTHER PUBLICATIONS

International Search Report for International Appln. No. PCT/US96/20772 filed on Dec. 5, 1996.

*Primary Examiner*—Stella Woo
*Attorney, Agent, or Firm*—Limbach & Limbach L.L.P.; Seong-Kun Oh

[57] ABSTRACT

A private video telephony system or individual telephone set in which a predetermined video program is transmitted over the telephonic connection to another telephone set to which the first telephone set is connected over the telephone lines when the first telephone set is placed in hold mode.

31 Claims, 2 Drawing Sheets

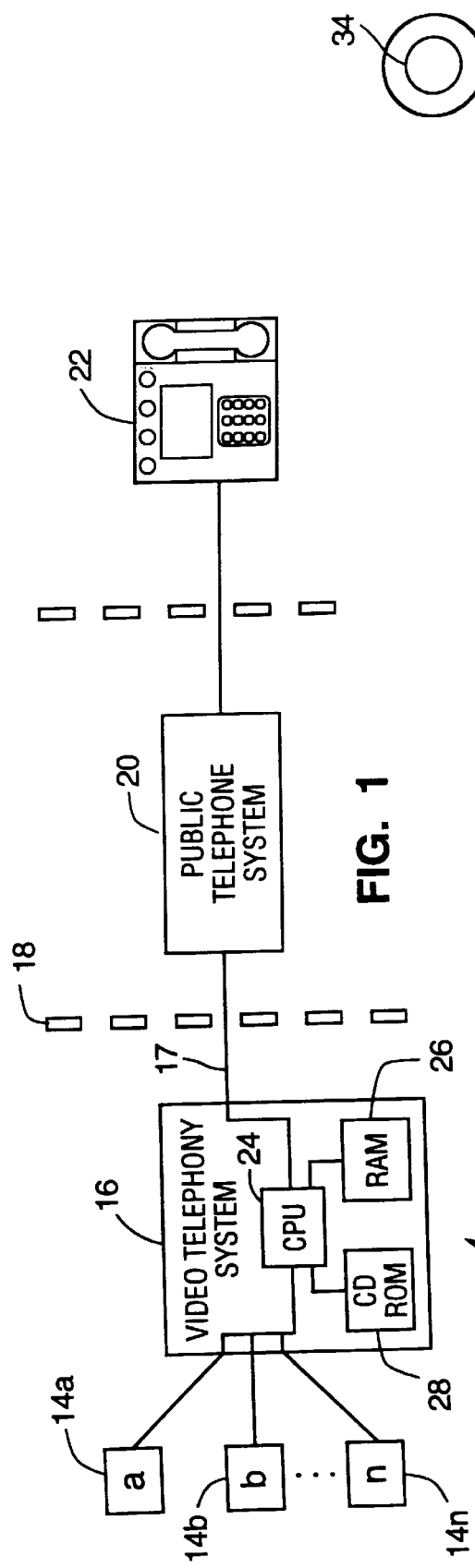
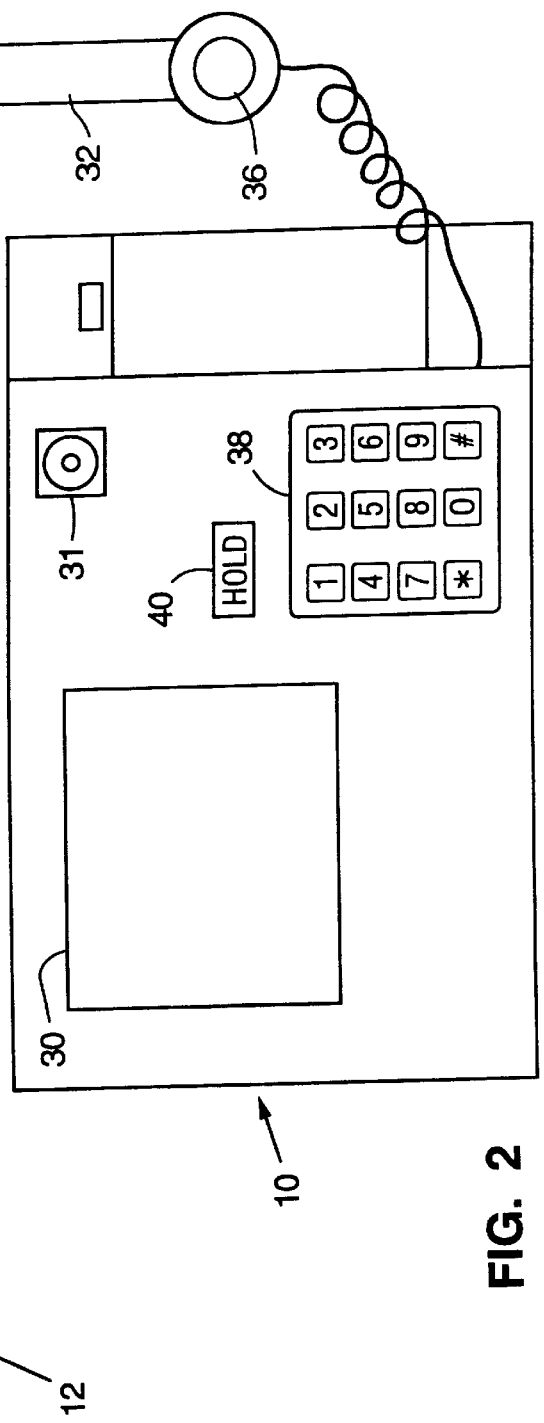

VIDEO TELEPHONY SYSTEM WITH HOLD PROGRAM

FIELD OF THE INVENTION

The present invention pertains to video telephony. More particularly, the present invention pertains to signal transmission when one of the telephones is placed in a hold mode.

BACKGROUND OF THE INVENTION

Currently, video telephony is relatively uncommon, but is likely to become increasingly more common over the next twenty years. In video telephony, each telephone set includes apparatus for receiving video data from the telephone lines and a CRT or similar video display device for reproducing the received video data. Video telephones also include a video camera and apparatus for placing video data produced by the camera onto telephone lines. Video telephones also include apparatus for transmitting and receiving audio data. Accordingly, not only are video signals transmitted and received, but audio signals are also transmitted and received.

In many parts of the country, older telephone lines have been replaced with fiberglass telephone lines or other broad bandwidth telephone lines which are capable of transmitting video as well as audio signals in real time. However, even with older, lower bandwidth telephone wires, it is still possible to transmit still images over the telephone lines.

Many telephone companies have converted or will convert in the future to an integrated services digital network system (ISDN). In ISDN based public telephone systems, when a customer activates hold mode operation at a telephone set, the actual communication link between that telephone set and the remote telephone set is released to allow those public telephone wires to be used for other telephone calls. However, in order to re-establish the link between the two telephones when hold mode operation is deactivated, the public telephone system stores data indicating which two telephones were connected and re-establishes the link over any set of available lines when the hold mode operation is deactivated. This feature of ISDN protocol public telephone systems provides more efficient use of the telephone lines.

Many audio only telephones and private telephony systems (e.g., a private branch exchange (PBX)) provide the ability to activate a hold mode in a telephone set, in which mode a previously established telephone line connection to another telephone is maintained open, but no signals are allowed to be received or transmitted from the telephone set which has activated the hold mode. A user of the telephone might activate the hold mode if and when the user needs to walk away from the telephone conversation for a limited time. Alternately, the user may simply wish to carry on a side conversation with other persons in the room which he or she does not wish the person or persons on the other end of the telephone connection to hear.

It is well known with respect to audio only telephone systems to transmit a predetermined audio program from the telephone set which activated hold mode over the telephone connection to the other telephone when in hold mode. In this way, the person on the telephone at the other end of the connection can hear a musical selection or verbal message while he or she is on hold in order to prevent boredom.

Accordingly, it is an object of the present invention to provide an improved video telephony system.

It is another object of the present invention to provide a video telephony system in which a predetermined video program is transmitted over the telephone link when the telephone set's hold mode is activated. The video program transmitted during the hold mode is a dynamic and continuous program such as a television program rather than a static and still display of image which is more likely to bore the party placed on hold and lose that party's interest.

It is yet a further object of the present invention to provide a video telephony system in which, when a video telephone set on the system is placed in hold mode, the system transmits a predetermined combined video and audio signal over the telephone lines to the other party.

It is yet another object of the present invention to provide a video telephony system for use with the ISDN based public telephone system in which, when a telephone set's hold mode operation is activated, a predetermined video signal is transmitted by an outside contractor to the party placed on hold.

SUMMARY OF THE INVENTION

The invention comprises a private video telephony system in which the individual telephone sets on the system are capable of activating a hold mode of operation. In a preferred embodiment of the invention, the telephone system includes a plurality of telephone sets and a network server coupled together over a PBX or other local area network. When a user activates the hold mode of a video telephone on the system, the network server detects that condition arid transmits a combined video and audio signal over the telephone connection established by the video telephone set which activated the hold mode to the party which has been placed on hold. Accordingly, the party at the other end of the telephone connection receives the combined video and audio signal, which hopefully will keep the interest of the party placed on hold during the hold period.

Alternately, an individual video telephone set may include apparatus for generating a predetermined video and audio program which is activated and transmitted over the telephone line when the user of the telephone set activates the hold mode.

Even further, where the video telephone or video telephony system is coupled to a public telephone system using ISDN hardware and communication protocol, the combined video and audio signal which is transmitted during the hold mode can be transmitted over the established link from a separate location. Particularly, in ISDN based telephone systems, when a telephone's hold mode is activated, the telephone line over which the connection was made is not used to maintain the connection. Instead, the telephone company local to the telephone on which hold mode operation was activated releases the lines, and keeps a record of the two telephones which had been linked. When the hold mode is released, the telephone company re-establishes the link using any set of available lines. Accordingly, in ISDN systems when one telephone invokes hold mode, an outside contractor can establish a link to the remote telephone and transmit a combined video and audio hold program to the remote telephone. The outside contractor would need access to the central switching apparatus of the local telephone company. Accordingly, the local telephone company may itself provide such a service to its customers.

BRIEF DESCRIPTION OF THE DRAWINGS

FIG. 1 is a block diagram of a video telephony system according to a first embodiment of the present invention.

FIG. 2 is a pictorial diagram of a video telephone set in accordance with the present invention.

DETAILED DESCRIPTION OF THE INVENTION

Figure 3:
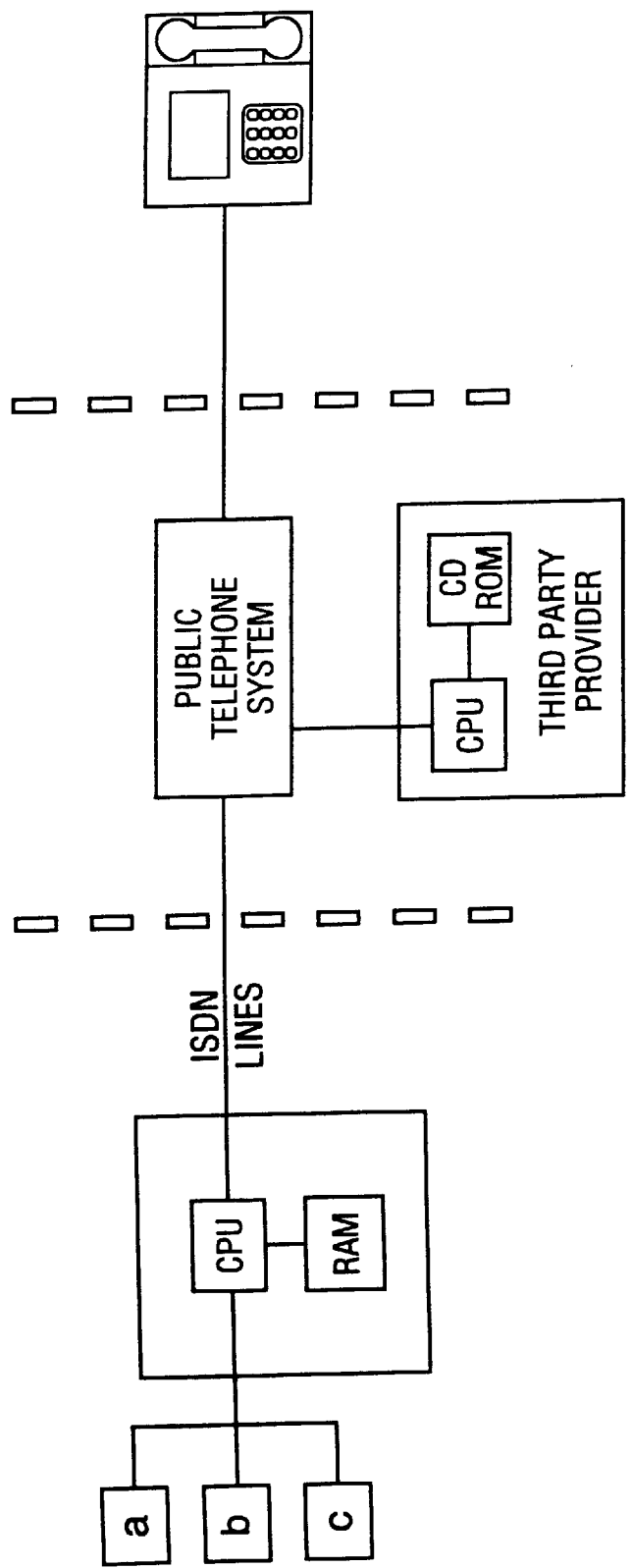
FIG. 3 is a block diagram of a video telephone system in accordance with a second embodiment of the present invention.

FIG. 1 illustrates a first embodiment of the present invention. In this embodiment, a video private telephone system 12 comprises a plurality of telephone sets 14a, 14b, ... 14n which are coupled over a local area network to a network server station 16. The private telephony system 12 may be substantially similar to any number of audio-only PBX telephone systems which are commonly found in business offices but including video capabilities.

It is to be understood that the video telephony system 12 appearing to the left of dotted line 18 in FIG. 1 is a private telephone system, such as a PBX, which commonly might be found in a business office. Such a system typically may comprise a plurality of telephone sets, 14a through 14n, and a network server 16 for providing centralized voice mail, video and/or other services coupled together over a local area network.

The video telephony system 12 is coupled to a public telephone system 20 (e.g., any of the baby Bell telephone companies) in order to allow any one or more of telephone sets 14a through 14n to communicate with another party at a remote telephone set 22.

The private video telephony network server station 16 of system 12 may include a central processing unit (CPU) 24 for operating the system 12. The CPU performs such functions as operating a voice or video mail system using a random access memory 26 for the storage of outgoing and incoming messages, selecting and establishing links between the individual telephone sets 14a to 14n and the public telephone system 20, selecting and establishing local links between two telephones on the system 12 (e.g., intercom type communications between telephones sets 14a and 14b) without the use of the public telephone system 20.

In accordance with the present invention, the network server station 16 is further equipped with a compact disk-read only memory (CD-ROM) 28 or other similar storage device for storing a combined audio and video program which can be read out and transmitted over the public telephone system 20 to a remote telephone 22. Instead of a CD-ROM, any other type of storage device with sufficient memory to store a video signal can be used. Even further, it is not necessary that the video program which will be transmitted in hold mode be a stored signal. For instance, the video program may be a changeable program which is generated by a processor or a similar device. Further, the video program may be a re-transmission of a video signal which is being concurrently received from an external source (e.g., a local television station signal). For example, the company may wish to send a video program which comprises live transmission of a television coverage of a sports event. In such an instance, the video program could not be a pre-recorded program. The information may simply be received from the external source and re-transmitted. Alternatively, it may be desired to simply show the time of day in various cities throughout the world. In this case, a software running on a local processor may simply generate a video display showing the time of day in various parts of the world based on the local processor clock.

CPU 24 is programmed to commence playback of the program and transmit the combined audio and video signal over an established link of one of the telephones (e.g., telephone set 14b) and the remote telephone 22 to which it is connected when the user of the telephone set 14b activates its hold mode operation. The party at remote telephone set 22 receives the combined video and audio signal, which hopefully will keep the interest of that party during the period in which he or she is on hold.

Each telephone set 14a to 14n which is coupled to the video telephony system 12 preferably includes, at a minimum, the features shown in FIG. 2. As illustrated, the telephone set 10 includes a CRT 30 or similar video reproduction device, such as a liquid crystal display (LCD)a camera 31 or similar video acquisition device for converting an image into a video data for electrical transmission, a speaker 34 or a similar device for receiving electrical impulse signals and converting them to audio signals and a microphone 36 for receiving audio signals, and converting them into electrical signals. The telephone set 10 preferably also includes a keypad 38 comprising at least ten digits 0–9, a pound sign key and an asterisk key for dialing the telephone and entering other data. The telephone set 10 includes a button 40 for activating/deactivating the hold mode operation. Alternately, the telephone set 10 may not have any keys at all but may be voice activated or may have a touch screen. The present invention can be adapted to operate with any means for inputting the operation information such as the number dialed and the hold mode activation signal.

The telephone set also includes an internal electronic circuitry for processing audio and video signals for placement on and retrieval from the PBX or the public telephone system.

When the user at a particular telephone set, for e.g., 14b, on the video telephone system 12 activates the hold mode operation, such as by depressing the hold button 40, a circuitry (not shown) in the telephone set 10 (FIG. 2) sends a signal to the network server station 16 informing the CPU 24 that the remote telephone set 22 has been placed in the hold mode. Responsive to that signal, the CPU 24 activates the CD-ROM 28 or other video/audio storage or generating device to begin reproducing a recorded combined audio and video program and sends the combined audio and video output signal from the CD-ROM 28 out over a connection 17 and the public telephone system 20 to the remote telephone set 22.

When the user depresses the hold button 40 a second time to deactivate hold mode, the CPU 24 deactivates the CD-ROM 28, drops the connection between CD-ROM 28 and the remote telephone set 22 and re-establishes the connection between the telephone set 14b and the remote telephone set 22.

In an alternate embodiment of the invention, the combined audio and video program stored in the CD-ROM 28 is continuously played from beginning to end and repeated. Whenever one of the telephone sets 14a–14n on the system 12 has its hold mode activated, the CPU 24 establishes the connection between the CD-ROM 28 and the remote telephone set 22 to which one or more of the local telephone sets 14a–14n was connected. In this manner, multiple remote parties can receive the program simultaneously from the single CD-ROM 28. The disadvantage of this method is that any remote party typically will begin receiving the program at some intermediate point rather than from the beginning.

If it is preferred that each party placed on hold receive the program commencing at the beginning, then the system 12 can contain multiple copies of the program stored on multiple memory devices, each of which can be activated individually. An even further alternative is to use a single very high speed memory device which can be read out at two or more times the nominal speed needed to reproduce the program. In such a high speed system, the program can commence from different memory locations simultaneously and time multiplexed so that one remote telephone set receives an uninterrupted reproduction of the program commencing from one point while another telephone set receives an uninterrupted reproduction of the program commencing from a different point.

The combined audio and video program may be a general interest program such as re-transmission of a television program or the like. Alternatively, it may contain information or advertising about the party who activated the hold mode operation, particularly, if that party is a corporation or other commercial entity.

Further alternatives should be obvious to those of ordinary skill in the related arts.

According to a further alternate embodiment of the invention, an individual telephone set may be equipped with a CPU and CD-ROM or similar storage device for carrying out the invention without the need for coupling to a private telephony system.

FIG. 3 illustrates another embodiment of the present invention which is particularly adapted for use with public telephone systems which utilize ISDN hardware and protocol.

In ISDN based public telephone systems, when the hold mode operation is activated at a telephone set, the actual communication link between that telephone set and the remote telephone set is released to allow its use for other purposes, such as establishing another link between two other telephones. This allows for more efficient use of telephone connection resources since telephone lines over which no data is being transmitted need not remain idle during hold mode. However, in order to re-establish the link between the two telephones when the hold mode operation is deactivated, the public telephone system stores data indicating which two telephones were connected. The public telephone system can then re-establish the link over any set of available lines when the hold mode operation is deactivated.

Accordingly, when a video telephone system is coupled to an ISDN based public telephone system, an outside contractor may provide the combined audio and video program to the remote telephone set. Thus, when the hold mode is activated at a telephone set, the connection between that telephone set and the remote telephone is dropped. The contractor then establishes a new link between itself and the remote telephone set which has been placed on hold (not the telephone on which hold mode has been activated). The contractor will use this link with the remote telephone set to transmit a predetermined combined audio and video program to the remote telephone set while it is on hold.

The outside contractor would need access to the central switching apparatus of the public telephone system in order to have access to the connection information. Accordingly, the local telephone company may itself provide such a service to its customers or allow a third party access to its switching system so that it may provide such a service.

The present invention can also be adapted to operate with any digital data transmission system other than ISDN.

In the above-discussed preferred embodiments of the invention, the video program is generated at and transmitted from (1) a video phone, (2) a PBX adapted to support video phones, or (3) a public network. The invention can be even further adapted to an embodiment in which the video program is generated at the telephone which receives the video program. The present invention is envisioned for use the in video-conferencing-enabled kiosks. For instance, the video-conferencing-kiosk may link a person at the kiosk seeking information from trained personnel at a remote location so that the person seeking information can ask questions. Typically, there may be long periods during which the parties at the opposite ends of the link may not be interacting. For instance, when a person first walks up to the kiosk, it may take a few moments to establish a link to the remote centralized information center. During this time, the kiosk may include a local CD-ROM or the like for playing a pre-recorded video program during such periods.

Although the above-described preferred embodiment relates to a telephone or a telephone system in which the video program is transmitted during the hold mode, other types of operation are also possible. For instance, a video or combined video and audio signal may be automatically transmitted as an outgoing message of an answering machine or voice mail system when a call is first picked up.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A video telephone system for transmitting a non-live video program to a remote telephone, the telephone system comprising;

means for converting live images into video data for transmission from a telephone to a remote telephone;

means for establishing a link between said telephone and said remote telephone over which said telephone and said remote telephone are configured to exchange said video data;

means for generating a non-live video program; and means for switching said telephone system between a first operational mode in which said means for converting is coupled to said means for establishing and a second operational mode in which said means for generating is coupled to said link;

wherein during said second operational mode, said non-live video program is transmitted to said remote telephone over said link, said second operational mode being a hold mode; and further wherein during said hold mode, said link between said telephone and said remote telephone is established.

2. An apparatus as set forth in claim 1 wherein said telephone system further comprises means for converting sound into audio data for transmission from said telephone to the remote telephones;

wherein said means for establishing further comprises exchange means over which said telephone system and said remote telephone exchange said audio data; and further wherein said video program comprises a combined video and audio program.

3. An apparatus as set forth in claim 2 wherein said telephone system comprises a telephone.

4. An apparatus as set forth in claim 2 wherein said telephone system comprises a PBX.

5. An apparatus as set forth in claim 2 wherein said means for converting images into video data comprises a camera and wherein said means for converting sound comprises a microphone.

6. An apparatus as set forth in claim 5 wherein said means for generating comprises storage means for storing a predetermined video program.

7. An apparatus as set forth in claim 6 wherein said storage means comprises a CD ROM.

8. An apparatus as set forth in claim 5 wherein said means for generating comprises means for receiving a video program and retransmitting said video program over said link.

9. An apparatus as set forth in claim 5 wherein said means for generating said video program comprises a processor for generating a video program upon activation of said second operational mode.

10. An apparatus as set forth in claim 5 wherein said telephone system further comprises:

means for reproducing video data received over said link; and means for reproducing audio data received over said link.

11. An apparatus as set forth in claim 10 wherein said means for reproducing video data comprises a cathode ray tube, and wherein said means for reproducing audio data comprises a speaker.

12. An apparatus as set forth in claim 1 wherein said telephone system comprises a plurality of telephone sets coupled over a local area network to a private telephone network server and wherein said means for generating are located at said network server and are shared by said plurality of telephone sets.

13. An apparatus as set forth in claim 1 wherein said means for switching comprises a processor.

14. An apparatus as set forth in claim 13 wherein said means for switching further comprises a HOLD button.

15. A video telephone system for causing a non-live video program to be displayed at a telephone, the video telephone system comprising:

a first telephone system having means for receiving video data and converting it for visual display;

a second telephone system having means for converting live images into video data for transmission to the first telephone system;

means for establishing a link between said first telephone system and said second telephone system over which said second telephone system transmits said live video data to said first telephone system for display at said first telephone system;

means, located at said first telephone system, for generating a non-live video program; and means for switching said first telephone system between a first operational mode in which said first telephone system displays said live video data received from said second telephone system and a second operational mode in which said first telephone system displays said non-live video program such that said first telephone system does not receive any video data during said second operational mode, said second operational mode being a hold mode: and further wherein during said hold mode, said link between said telephone and said remote telephone is established.

16. An apparatus as set forth in claim 15 wherein said mean for generating comprises storage means for storing a predetermined video program.

17. An apparatus as set forth in claim 16 wherein said first telephone system comprises a video-conferencing-enabled kiosk.

18. An apparatus as set forth in claim 15 wherein said means for generating comprises a processor for generating a video program upon activation of said second operational mode.

19. A video telephony system, comprising:

a first video telephone system;

a second video telephone system for receiving and transmitting a continuous video program;

connection means for linking the first video telephone system to the second video telephone system; and a controller for selectively coupling the first video telephone system to the second video telephone system via the connection means and in accordance thereto displaying the continuous video program at the first video telephone system such that said controller couples said first video telephone system to said second video telephone system for displaying said continuous video program at said first video telephone system when said first video telephone system is placed in a hold mode operation by said second video telephone system;

wherein during said hold mode operation, said first and second video telephone systems are linked.

20. The video telephony system of claim 19 wherein the second video telephone system is a PBX.

21. The video telephony system of claim 20 wherein the second video telephone system comprises a plurality of telephone sets.

22. The video telephony system of claim 19 wherein the second video telephone system includes input means for inputting video and audio program and operation information.

23. The video telephony system of claim 22 wherein the input means for inputting video program is a camera and further wherein the input means for inputting audio program is a microphone.

24. The video telephony system of claim 19 wherein the connection means comprises a public telephone system.

25. The video telephony system of claim of 19 wherein the continuous video program includes a television program.

26. The video telephony system of claim 19 wherein the controller further includes processing means for processing the video program for placement on and retrieval from the connection means.

27. The video telephony system of claim 26 wherein the processing means is a central processing unit (CPU).

28. The video telephony system of claim 19 wherein the controller further includes storage means for storing the video program and in accordance thereto transmitting multiple copies of the video program.

29. A video telephony system, comprising:

video program generating means for transmitting a continuous video program;

a first video telephone system for displaying the continuous video program from the video program generating means;

a second video telephone system for outputting operation information; and a controller for receiving the operation information and in accordance thereto selectively coupling the first video telephone system, the second video telephone system, and the video program generating means;

wherein said operation information includes a hold-mode operation such that when said second video telephone system outputs said hold-mode operation information, said controller controls said first video telephone system to display said continuous video program;

wherein during said hold-mode operation, said first and second video telephone systems are coupled.

30. The video telephony system of claim 29 wherein the operation information includes hold mode operation such that when activated, the controller couples the first video telephone system to the video program generating means for displaying the continuous video program at the first video telephone system.

31. The video telephony system of claim 30 wherein the controller couples the first video telephone system to the second video telephon system when the hold mode operation is deactivated.

* * * * *